United States Patent Office 3,218,374
Patented Nov. 16, 1965

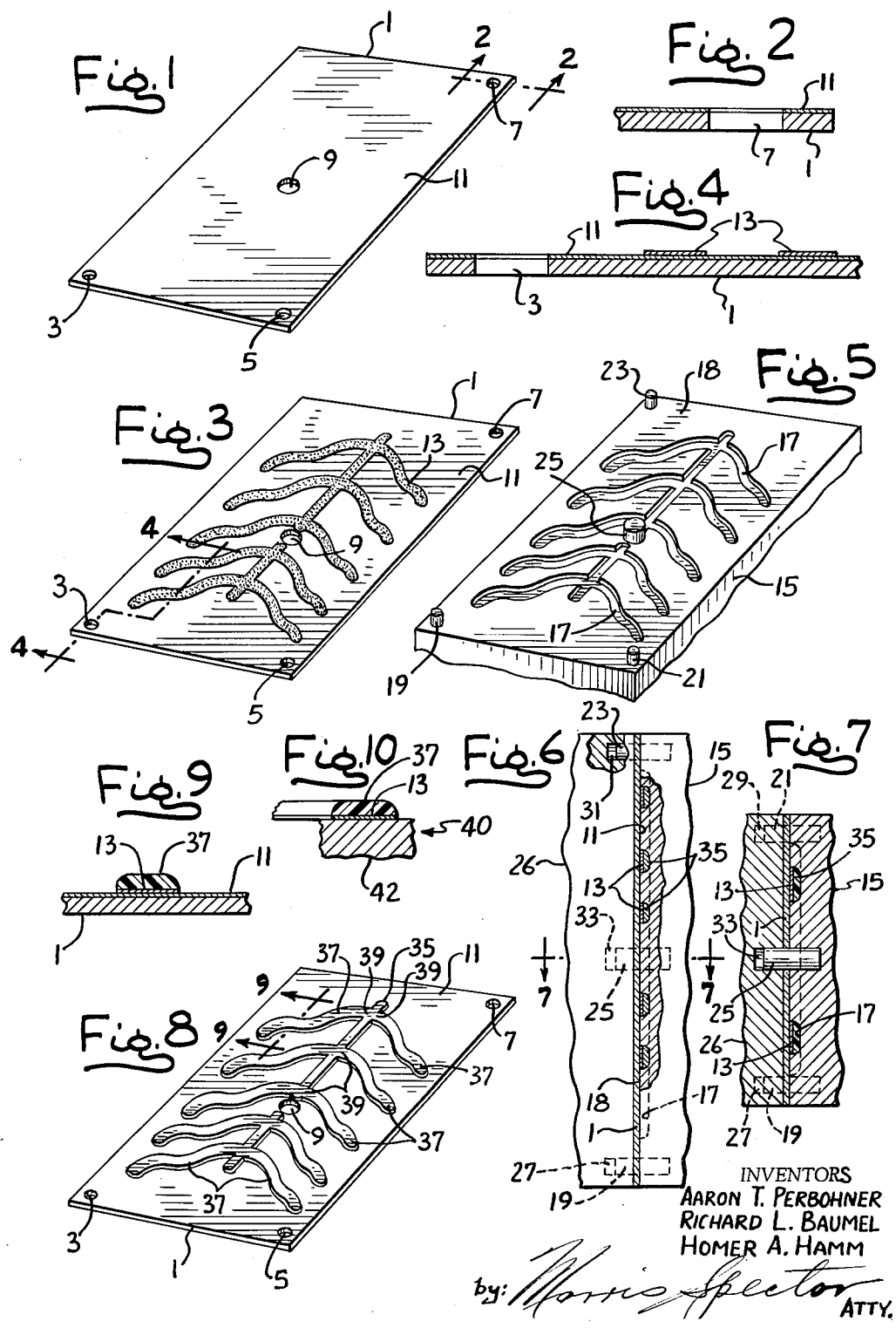

3,218,374
DENTAL MOLD PATTERN AND METHOD OF MAKING SAME
Aaron T. Perbohner, Highland Park, and Richard L. Baumel and Homer A. Hamm, Cook County, Ill., assignors to Durallium Products Corporation, Chicago, Ill., a corporation of Illinois
Filed Jan. 24, 1962, Ser. No. 168,332
7 Claims. (Cl. 264—17)

The invention relates to dental mold making and, more particularly, to a plastic dental mold pattern piece having a pressure-sensitive adhesive on one surface thereof.

In the art of dental mold making, plastic pattern material in the form of strips or the like are frequently applied to incompleted or even to completed models. The plastic pattern material is of the type that will melt at a relatively low temperature so that after the mold is made around the dental model of which plastic pattern piece or pieces are a part, the pattern may be eliminated by heat and the resulting mold cavity filled with molten metal or other material constituting the resulting casting. The plastic pattern pieces are generally sold in a variety of pre-molded shapes for use in the production of molds for various types of dentures, as for instance, dental bridges. It is customary to secure the plastic pattern piece to the model by gluing. This procedure is troblesome and increases the time required for making the mold pattern, particularly if a number of plastic pieces are used.

It is an object of the present invention to provide a plastic dental mold pattern piece (or plurality of such pieces) each with a layer of pressure-sensitive adhesive on one surface thereof, thereby eliminating the necessity of applying adhesive before securement of the pattern pieces to the model.

It is also an object of the present invention to provide a method of making the plastic pattern pieces in which the pieces are molded so that the pressure-sensitive adhesive may be used to secure the pieces releasably to a sheet, and thereby supporting them on the sheet to facilitate the packaging and handling of a large number of the patterns prior to their use in the mold-making process.

It is a further and more specific object of the present invention to provide a method of making an article of the type stated in which a pressure-sensitive adhesive is applied to the sheet in the configuration of the plastic article to be molded, the surface of the sheet being one against which the pressure-sensitive adhesive releasably adheres. Thereafter, the plastic is molded onto the pressure-sensitive adhesive so that the plastic covers precisely the same area on the sheet as does the pressure-sensitive adhesive. The pressure-sensitive adhesive is of a type that will remain adhered to the plastic when the latter is thereafter stripped from the sheet so that the plastic may thereafter be secured to another object, such as a dental model.

The attainment of the above and further objects of the present invention will be apparent from the following specification taken in conjunction with the accompanying drawing.

In the drawing:

FIG. 1 is a perspective view of a sheet upon which the plastic is to be molded;

FIG. 2 is a fragmentary sectional view taken along line 2—2 of FIG. 1;

FIG. 3 is a perspective view of the sheet of FIG. 1 after having pressure-sensitive adhesive applied thereto;

FIG. 4 is a fragmentary sectional view taken along line 4—4 of FIG. 3;

FIG. 5 is a perspective view of a mold member that is used in the method of the present invention;

FIG. 6 is an elevational view, partially broken away and in section, and showing the molding of the plastic onto the pressure-sensitive area of the sheet of FIG. 3;

FIG. 7 is a fragmentary sectional view taken along line 7—7 of FIG. 6;

FIG. 8 is a perspective view of the completed article made in accordance with the present invention;

FIG. 9 is a fragmentary sectional view taken along line 9—9 of FIG. 8; and

FIG. 10 is a fragmentary sectional view showing the plastic pattern piece secured to a wax mold model.

Referring now in more detail and by reference characters to the drawing which illustrates the preferred embodiment of the present invention, 1 designates a cardboard sheet having a plurality of holes 3, 5, 7 adjacent to three corners thereof, and a hole 9 approximately centrally thereof. On one surface thereof, the sheet 1 is covered throughout with a thin layer of a pressure-release coating 11. This release coating 11 may be a conventional liquid silicone release agent that is painted onto the sheet 1 and which thereafter dries rather quickly. Other suitable pressure-release materials may be used as, for example, a polytetrafluoroethylene resin commonly sold under the trademark "Telflon."

After the pressure release coating 11 has dried, a layer of pressure-sensitive adhesive 13 is silk screened or otherwise applied over the release coating 11. As seen by reference to FIGS. 3 and 4, the pressure-sensitive adhesive 13 has a predetermined configuration generally somewhat less than the total area of the pressure-release layer 11, and for purposes more fully appearing. For purposes of the present invention, the pressure-sensitive adhesive 13 may be a plasticized copolymer of butadiene and acrylonitrile, commonly known as Buna N. After applying the pressure-sensitive adhesive 13 it may then be cured until it has the desired tackiness.

A mold member 15 has a mold cavity 17 which at the face 18 of the mold member 15 has a configuration precisely the same as that of the layer of pressure-sensitive adhesive 13. Projecting outwardly from the mold face 18 are pins 19, 21, 23, 25 which are adapted to project through the holes 3, 5, 7, 9. When the sheet 1 is placed on the mold face 18 with the pins 19, 21, 23, 25 projecting through the holes 3, 5, 7, 9 and with the pressure-sensitive adhesive 13 presented toward the mold face 18, the inter-engagement of the pins and holes will cause the area of pressure-sensitive adhesive 13 to register with the mold cavity 17. Consequently, the portion of the sheet 1 that is covered by the pressure-sensitive adhesive 13 constitutes the closure for the mold cavity 17.

The mold member 15 also cooperates with a second mold member 26 that has holes 27, 29, 31, 33 which receive the pins 19, 21, 23, 25 whereby the sheet 1 with the pressure-sensitive adhesive 13 in proper registration with the cavity 17, is snugly sandwiched between the mold members 15, 25. It will be understood, of course, that the mold cavity 17 may be coated with a suitable mold release agent before assembly of the mold members 15, 26 with the sheet 1.

A suitable plastic material 35 is then injected into the mold at a temperature of about 200° F. to 400° F. to fill the mold cavity 17, as shown in FIGS. 6 and 7. The plastic material 35 is preferably one which is highly pliable and to which the pressure-sensitive adhesive 13 will adhere. One such plastic material suitable for the present invention has been found to be ethyl cellulose with conventional plasticizers.

When the plastic has cooled, the mold members 15, 26 are separated, and the sheet 1 removed, the result being the product shown in FIGS. 8 and 9. The plan view configuration of the plastic 35 will be the same as that of the pressure-sensitive adhesive 13 and the latter will serve to hold the plastic 35 onto the sheet 1. The shape of the plastic 35 may be that of a plurality of dental mold pattern pieces 37 that may be individually separated from the remainder of the plastic along lines of weakness 39. When each pattern piece 37 is stripped from the sheet 1, the pressure-sensitive adhesive releases from sheet 1 but remains with the piece 37.

A dental model, a fragmentary part of which is shown at 40 in FIG. 10, may be made in the conventional manner in accordance with the size and shape of part to be cast. One or more plastic pattern pieces of the type heretofore described may be required to complete the model part 42 as, for instance, where the pattern is for a dental bridge. In that case a pattern piece 37, or a plurality of such pieces, may be secured to the model part 42 by the pressure-sensitive adhesive 13. Thereafter, the model 40 is invested in a suitable mold investment composition and the dental mold completed in the usual manner.

While one dental mold pattern piece has been illustrated, it will be evident that pattern pieces of other shapes can be molded in accordance with the present invention. Furthermore, articles other than mold patterns may be molded by the process of the invention.

In lieu of cardboard, the sheet 1 may be of aluminum foil or other material capable of withstanding the molding temperatures. Furthermore, the application of the release coating 11 may be eliminated where the sheet 1 is of a material having a surface that is inherently pressure-releasable with respect to the pressure-sensitive adhesive used. Thus where Buna N is used as the pressure-sensitive adhesive, no release agent need be used where the sheet 1 is of "Teflon."

The plastic material 37 is soft, readily stretchable, easily conformable to intricate shapes, has a low cold flow temperature, and will burn out completely at a temperature of the order of 1500–1600 deg. F. Essentially it is formed of 4 parts low viscosity ethyl cellulose, 2 parts hydrogenated rosin, 3 parts of a non-migratory plasticizer (Rohm & Haas Co. "Paraplex" G–62 which is an epoxidized oil of the type described in U.S. Patent No. 2,569,502, or "Paraplex" G–40 which is a linear polyester formed from a dibasic acid and a glycol, a product of the type described in British Patent No. 588,574), and 3 parts of polymerized styrene, all of which are dissolved in methyl-ethyl ketone which is then evaporated away in a pan, leaving a residue that is later cut into pieces and injection molded to the desired pattern as the plastic pattern 37. Other compositions for making the plastic pattern material for use in making dental patterns are known in the art and may be used in lieu of the above.

In compliance with the patent statutes we have herein shown and described a preferred embodiment of the present invention. It should be understood, however, that the invention is not limited to the precise construction or method herein shown, the same being merely illustrative of the principles of the invention. What is considered new and desired to be secured by Letters Patent is:

1. A method of making a plurality of mold pattern pieces that are part of a unitary plastic mass that is removably secured to a member by pressure-sensitive adhesive of substantially identical configuration as that of the mass and which adheres to the pattern pieces when the latter are stripped from the member, said method comprising applying the pressure-sensitive adhesive to a surface of the member on which the adhesive releasably adheres and in a predetermined configuration that is the same as the plastic mass and covers substantially less area than the total area of said surface of said member, and then molding onto the pressure-sensitive adhesive in said predetermined configuration the plastic to form the pattern pieces and which plastic adheres to the pressure-sensitive adhesive and remains adhered thereto when the pattern pieces are thereafter stripped from said surface.

2. A method of making a plurality of mold pattern pieces that are secured to a member by pressure-sensitive adhesive, said method comprising applying pressure-sensitive adhesive to a surface of the member on which the adhesive releasably adheres and in a predetermined configuration that covers substantially less area than the total area of said surface of said member and includes the configurations of the pattern pieces, and then molding at a temperature of about 200° F. to 400° F. onto the pressure-sensitive adhesive in said predetermined configuration a plastic to form the pattern pieces and which plastic adheres to the pressure-sensitive adhersive and remains adhered thereto when the pattern pieces are thereafter stripped from said surface.

3. A method according to claim 5 further including applying a coating of a pressure release material to the surface of a sheet.

4. A method according to claim 3 wherein the plastic is ethyl cellulose.

5. A method according to claim 4 wherein the pressure-release material is a liquid silicone and the pressure-sensitive adhesive is a plasticized copolymer of butadiene and acrylonitrile.

6. A method of making a plurality of mold pattern pieces that are removably secured to a sheet by a pressure-sensitive adhesive, said method comprising applying pressure-sensitive adhesive to a surface of the sheet on which the adhesive releasably adheres and in a predetermined configuration that covers substantially less area than the total area of said surface of the sheet and includes the configurations of said mold pattern pieces, providing a mold having cavity means of said predetermined configuration, placing the sheet in molding position with the mold so that the sheet forms a closure for the cavity means with the predetermined configuration of adhesive facing the cavity means and in registration therewith, backing the sheet in its molding position and thereafter introducing into the mold cavity means plastic of a type that will remain adhered to the adhesive when the pattern pieces are stripped from the sheet to mold the plastic over the adhesive in said configuration.

7. A method of making a plurality of plastic dental mold pattern pieces that are part of a unitary plastic mass that is removably secured to a sheet by a pressure-sensitive adhesive of substantially identical configuration as that of the mass and which adheres to the pattern pieces when the latter are stripped from the sheet and wherein each pattern piece is secured to the mass by a line of weakness at which a particular pattern piece may be separated from the mass, said method comprising providing a sheet with a surface upon which the pressure sensitive material releasably adheres, applying pressure-sensitive adhesive to said sheet surface substantially in the configuration of the plastic mass to be formed and over an area that is less than the total area of the sheet, providing a mold having cavity means of the configuration of the plastic mass to be formed, assembling the sheet and mold so that the sheet forms a closure for the cavity means with the adhesive on the sheet facing the cavity means and in registration therewith, and introducing into the mold cavity means plastic of the type that will adhere to the adhesive to mold the plastic in a mass that is substantially in the configuration of the adhesive.

References Cited by the Examiner

UNITED STATES PATENTS

| | | | |
|---|---|---|---|
| 2,619,679 | 12/1952 | Baldanza | 156—240 XR |
| 2,633,139 | 3/1953 | Pettey | 154—53.5 XR |
| 2,765,998 | 10/1956 | Engert | 154—53.5 XR |
| 3,020,186 | 2/1962 | Lawrence | 156—248 |
| 3,026,573 | 3/1962 | Ciaio | 36—68 XR |

EARL M. BERGERT, *Primary Examiner.*

UNITED STATES PATENT OFFICE
CERTIFICATE OF CORRECTION

Patent No. 3,218,374 November 16, 1965

Aaron T. Perbohner et al.

It is hereby certified that error appears in the above numbered patent requiring correction and that the said Letters Patent should read as corrected below.

Column 4, line 12, for "adhersive" read -- adhesive --; line 15, for the claim reference numeral "5" read -- 2 --; line 37, after "position" insert a comma.

Signed and sealed this 19th day of July 1966.

(SEAL)
Attest:

ERNEST W. SWIDER
Attesting Officer

EDWARD J. BRENNER
Commissioner of Patents